July 25, 1967     R. W. EBLY ETAL     3,332,536
ROTATING SHAFT SEAL
Filed June 13, 1966
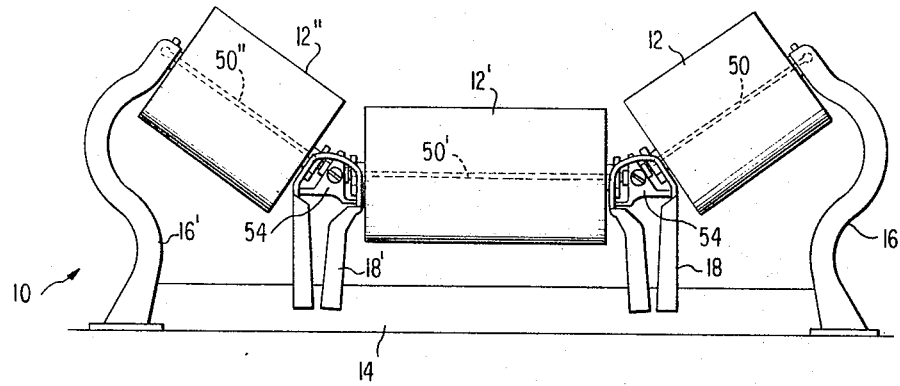
FIG.1
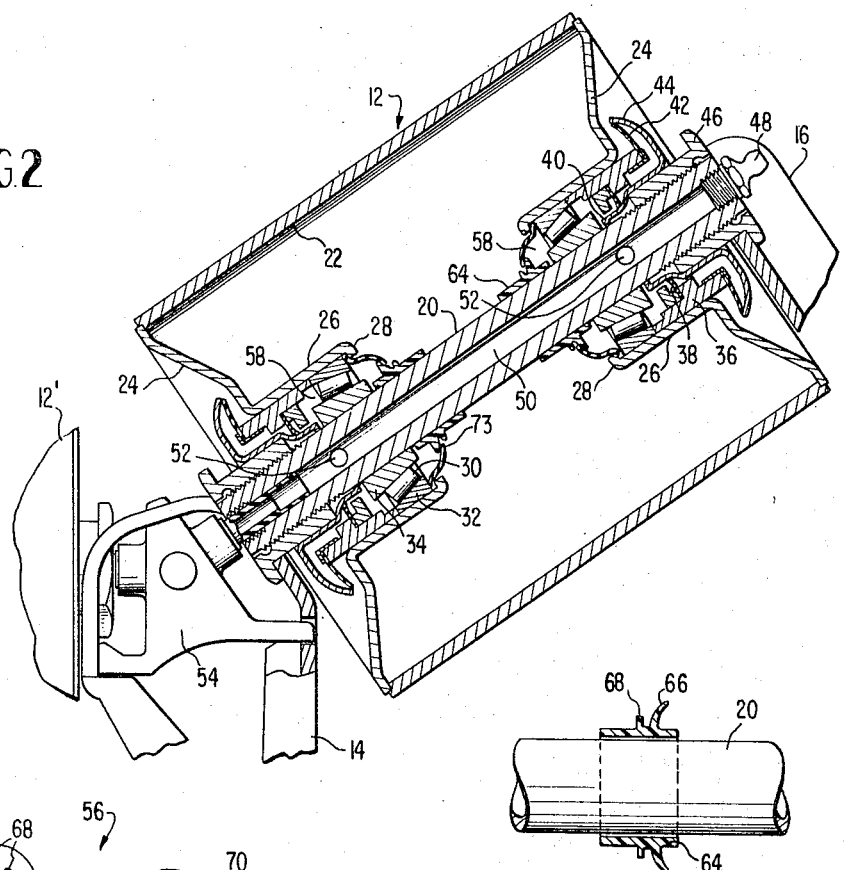
FIG.2
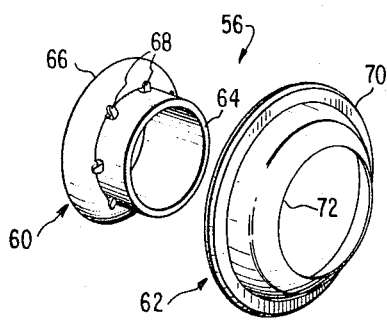
FIG.3
FIG.4
INVENTORS
RONALD W. EBLY
WASYLY G. HODLEWSKY
PHILIP J. IMSE
BY *Sughrue, Rothwell, Mion, Zinn, & Macpeak*
ATTORNEYS

United States Patent Office 3,332,536
Patented July 25, 1967

3,332,536
ROTATING SHAFT SEAL
Ronald W. Ebly, Big Bend, Wasyly G. Hodlewsky, Greendale, and Philip J. Imse, Wauwatosa, Wis., assignors to Rex Chainbelt Inc., Milwaukee, Wis., a corporation of Wisconsin
Filed June 13, 1966, Ser. No. 556,976
7 Claims. (Cl. 198—192)

This invention relates to improvements in rotating seals for shafts and particularly to a seal for the grease-lubricated bearings of the rolls of a belt-conveyor idler.

Conveyor rolls in idlers for belt conveyors are generally hollow and rotatably journalled on a stationary shaft. The bearings supporting the roll on the shaft are conventionally lubricated with grease. Further, the bearing chambers must be suitably sealed in order to prevent the lubricating grease from coming into contact with the conveyor belt. When bearings are lubricated by applying additional grease thereto, some grease must be allowed to escape from the grease filled bearing chamber, but any escaping grease must be kept from coming into contact with the conveyor belt running over the conveyor rolls. Accordingly, it is preferable to allow such displaced grease to escape through a passage from the bearing chamber into the roll and allow it to remain there.

In the prior art, this passage is between the shaft and a part of the roll which rotates at all times with the roll. Because of such rotation this passage must be large so that the grease therein will not result in too much drag on the rolls. However, a large passage allows the escape of too much grease as well as air so that while all the bearing chambers may have been properly greased initially (i.e. 40–60% filled with grease), in regreasing the bearing chamber in particular nearest the grease fitting becomes overfilled (i.e. 100% full) with grease and in addition excess grease is displaced into the roll. Similarly, the bearing chamber furthest from the grease fitting may receive no new grease.

The seal of the present invention includes a part defined a very small passage around the shaft which effectively controls the escape of displaced grease during greasing but at all other times this seal part may remain stationary with the shaft so that no drag or wear occurs in the normal operation of the roll. Also, the passage is of such size and length that the pressure drop therethrough made possible by the invention provides unique advantages in an idler of one of more rolls.

The seal includes two parts: an annular ring clamped for rotation with the roll and a tube freely movable and rotatable with respect to the support shaft and having a flange cooperating with an inner margin of the annular ring to seal the bearing chamber when lubricating grease is applied under pressure thereto. The flange and ring are spherical shaped to allow for deflection of the supporting shaft without corresponding loss of sealing effectiveness. The tube has a clearance on the shaft to provide therebetween the passage described and which allows some of the grease in the bearing chamber to escape into the cavity of the idler roll.

The accompanying drawing illustrates the best mode of carrying out the invention as presently contemplated and as set forth hereinafter.

In the drawings:

FIGURE 1 shows in elevation an idler including three rolls incorporating the seal of this invention;

FIG. 2 is a longitudinal sectional view through one idler showing the seal of this invention as applied to the bearings thereof;

FIG. 3 is a perspective view of two parts of the seal of this invention; and

FIG. 4 is an enlarged section through the shaft and part to show the passage therebetween.

Referring to the drawing, the conveyor idler 10 includes three rolls, 12, 12′, 12″ and a suitable support therefor including stand 14, end columns 16, 16′ and intermediate columns 18, 18′. The ends of the end rolls 12, 12″ are higher than the adjacent ends of the center roll so that a conveyor belt, not shown, may be supported on the idler to form a trough for the transport of bulk material.

Each roll has an identical end construction. As shown in FIG. 2, roll 12 includes a shaft 20 and comprises a cylindrical shell 22 and end discs 24. Each end disc 24 has an axially inwardly extending hub 26 provided with a radially inwardly extending lip 28. A tapered roller bearing 30 is positioned in each hub 26 and supports roll 12 for rotation on the shaft. The tapered roller bearing includes an outer race 32 pressed within hub 26 and an inner race 34 positioned on shaft 20. A seal carrier 36 carries the inner flange-type seal 38 which wipes against the element 40 carried by shaft 20 to prevent the outward escape of lubricant. A dust seal 42 is also carried by seal carrier 36 for cooperation with the flange shield 44 of element 40. Element 40 is carried by the nut 46 threaded on the end of the shaft 20. A grease fitting 48 of a conventional type is provided at the outer end of tubular shaft 20.

Shaft 20 includes an axial passage or bore 50 having transverse passages 52 extending therefrom. The grease connections 54 connect the adjacent ends of the shafts of rolls 12, 12′ and 12″ so that lubricant from fitting 48 can go through bores 50, 50′ and 50″ of the respective rolls 12, 12′, 12″ to lubricate the entire conveyor idler 10 from the one fitting 48. For this purpose, the end of bore 50″ should be closed or provided with a pressure sensitive relief valve, not shown.

The seal 56 of the present invention is provided to variously control the escape of lubricant from the inner side of chamber 58 in which bearing 30 is positioned. The seal 56 as shown in perspective in FIG. 3 includes two members, namely a tube member 60 and a ring member 62. The tube member 60 includes a cylindrical portion or tube 64 having an internal diameter of between .005 and .015 inch greater than the three-quarter inch external diameter of shaft 20 so as to be freely movable thereon. With the dimensions given for the embodiment shown, the length of the cylindrical portion may be equal to the diameter of the shaft. The tube member 60 also includes a spherical flange 66 and a plurality of retaining tangs 68 which latter facilitate assembly of the roll on the shaft.

The ring member 62 includes a peripheral clamping edge 70 and a spherical inner margin 72 having a radius of curvature substantially the same as spherical flange 66. The center of such curvature is generally at the center of bearing 30 to coincide with the center of shaft deflection.

The tube member 60 and ring member 62 are assembled so that, as shown in FIGS. 2 and 4, the tube member 60 is positioned on shaft 20 and is freely rotatable thereon while the ring member 62 is clamped with the peripheral clamping edge 70 between the lip 28 and the outer race 32 of tapered roller bearing 30. Thus, the ring member 62 is rotatable with the idler 12 while the tube member 60 is freely movable on shaft 20.

In carrying out the present invention, it is not intended that the single grease fitting 48 be used for the initial greasing of the rolls. Preferably, grease in the amounts required to partially fill each chamber should be simultaneously introduced through both ends of the bore 50, 50′ and 50″ of each individual roll and prior to their assembly in the idler, as described.

After such assembly and until the idler is to be regreased, the member 60 serves to close chamber 58 to the extent required according to its position relative to the chamber as will be described.

According to the present invention, the drag between shaft 20 and the tube 64 which is due to the grease in the small clearance therebetween generally keeps member 60 from rotating with the roll. However, when grease is applied to fitting 48 each flange 66 is pressed against the ring member 62 by the grease pressure in the chamber and member 60 then rotates with the roll. The clearance between the tube 64 and shaft 20 allows only a small amount of grease to escape into the roll, such amount being generally more than sufficient for relubrication of the bearing.

It has been found by the inventors that there is a sufficient replacement of grease even though the pressure drop through the clearance is increased to roughly approximate the pressure drop through the several bores 50, 50′ and 50″. At that rate, the several members 60 of the rolls of the idler function so that if the grease is applied to fitting 48 in a series of high-pressure "shots," the pressures in the several chambers tend to be sustained between shots. The resulting advantage is in the fact that the different pressures between chambers tend to equalize and to move grease through passages 50, 50′ and 50″ from the chambers having the higher pressures to those having the lower pressures.

The cooperation of spherical flange 66 of spherical margin 72 will allow deflection of shaft 20 (which is appreciable in a long heavily loaded roll) while still maintaining the seal. The length of tubular portion 64 of tube member 60 and its tolerance with regard to the outside diameter of shaft 20 is such that only a small and controlled amount of grease leakage occurs which is sufficient to prevent problems of over-lubrication of the bearing nearest the grease fitting 48 while preventing undue escape of grease into the interior of cylindrical shell 22. Any wear or friction drag due to excess lubrication of bearing cavity 58 occurs only during lubrication, and due to the spherical configuration of flange 66 and margin 72, the seal is maintained even if the shaft 20 is deflected.

It should be noted that except during such greasing, the tube members 60 are axially movable on shaft 20 between limits in particular as follows. Member 60 at the high end of roll 12 is disposed somewhat below chamber 58 and the flange 66 is in running contact with the inner margin 72 of member 62 as shown in FIG. 2 to provide an effective closure for chamber 58 without drag and wear. Member 60 at the low end of roll 12 is disposed somewhat above the corresponding chamber and a similar closure is not required or provided. Member 60 (not as shown) is allowed to position itself on shaft 20 with a clearance between flange 66 and margin 72. In such position member 60 may engage the inner race 34 of the bearing or, alternatively tangs 68 may engage member 62. The members 60 of roll 12′ may have either position described or any intermediate position.

Various modes of carrying out the invention are contemplated as within the scope of the following claims particularly claiming the subject matter which is regarded as the invention.

We claim:

1. In combination with inner and outer relatively rotatable members and means defining a bearing chamber therebetween, one of said members having an external grease fitting and a passage therefrom opening into said chamber, said inner member comprising a round shaft extending from the other end of said chamber, a self-regulating partial seal for said other end of the chamber comprising a tube freely mounted on said shaft with a clearance therebetween and having a radially extending annular flange, a ring fixed to and carried by said outer member at said other end of the chamber and having a central circular opening through which said tube freely extends and having the inner margin thereof about said opening positioned on the side of said flange which is opposite the chamber, said tube and flange being movable in one direction on said shaft by the grease entering said chamber under pressure such that the flange is tightly engaged with said margin of the ring and relative rotation of the tube and shaft allows some grease when the bearing chamber is under pressure to escape through the clearance between said tube and shaft, said tube being movable in the other direction so that under normal conditions the ring rotates relative to the flange and tube and the latter is stationary relative to the shaft.

2. The invention of claim 1 wherein the outwardly extending annular flange of the tube or the inner margin of the ring is or both are similarly part spherical in shape.

3. The combination of claim 1 wherein the tube includes retaining tangs spaced from the flange a sufficient distance to enable the tangs to retain the inner edge of the margin of the ring.

4. The combination of claim 1 wherein the outer member is a conveyor roll and the partial seal is on the side of the bearing chamber adjacent the center of the roll so that the escape of grease is into the interior of the roll.

5. In combination with a hollow roll having means defining a bearing chamber at each end thereof and a round fixed shaft extending through the roll and both chambers thereof, shaft seals outwardly closing the respective chambers, a ring defining an annular opening around the shaft from each chamber into the roll, said shaft having a non-return grease fitting at one end thereof and a central bore therefrom having openings into both chambers, pressure-regulating means for each said annular opening comprising a tube mounted on the shaft and an annular outward flange engageable with the inner periphery of the ring within the respective chamber, each tube and said shaft having a clearance therebetween adapted to receive and remain filled with grease, each tube and flange being axially movable on the shaft within limits so that the flange and corresponding ring either have a small clearance or a sliding engagement such that in either case the drag between the tube and shaft generally holds the tube and flange against rotation, said tube and flange also being axially movable into tight engagement with the corresponding ring by the pressure of the grease in the chamber as applied to the fitting and such that the tube and flange rotates with the roll, the length and cross-section of said clearance between each tube and the shaft defining a controlled discharge passage for grease from the respective chambers which in effect determines the pressure retention in the chambers and provides a period for the equalization of pressure and of the grease between the chambers and thereafter releases the members from such rotation with the roll.

6. The invention of claim 5 wherein the roll is supported by a frame to comprise a belt conveyor idler.

7. The invention of claim 6 wherein the idler includes two additional rolls and the adjacent ends of the shafts of the three rolls are connected so that their bores form a single passage from the grease fitting at one end of the idler which passage opens into all of the bearing chambers of the rolls of the idler.

References Cited

UNITED STATES PATENTS 2,539,792.   1/1951   Niemitz _____ 198—192 X

FOREIGN PATENTS 675,568   11/1929   France.

EVON C. BLUNK, *Primary Examiner.*

E. A. SROKA, *Assistant Examiner.*